(12) United States Patent
Raeymaekers et al.

(10) Patent No.: US 8,722,155 B2
(45) Date of Patent: May 13, 2014

(54) METHOD TO MANUFACTURE BIT PATTERNED MAGNETIC RECORDING MEDIA

(75) Inventors: Bart Raeymaekers, Salt Lake City, UT (US); Dipen N. Sinha, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 176 days.

(21) Appl. No.: 13/047,616

(22) Filed: Mar. 14, 2011

(65) Prior Publication Data

US 2012/0034396 A1    Feb. 9, 2012

Related U.S. Application Data

(60) Provisional application No. 61/340,113, filed on Mar. 12, 2010.

(51) Int. Cl.
*B06B 1/20* (2006.01)

(52) U.S. Cl.
USPC .......................................... 427/601; 427/600

(58) Field of Classification Search
CPC ......... B06B 1/20; B82Y 115/00; B82Y 40/00
USPC .................................. 427/601, 130, 131, 132
See application file for complete search history.

(56) References Cited

U.S. PATENT DOCUMENTS

| 4,846,988 | A | * | 7/1989 | Skjeltorp | 252/62.52 |
| 5,831,166 | A | * | 11/1998 | Kozuka et al. | 73/570 |
| 6,451,220 | B1 | * | 9/2002 | Ziolo et al. | 252/62.54 |
| 2001/0051229 | A1 | * | 12/2001 | Witt | 427/508 |
| 2010/0051904 | A1 | * | 3/2010 | Xiao et al. | 257/14 |

OTHER PUBLICATIONS

J. Shi et al, Lab Chip, 2009, 9, 2890-2895.*
Saito et al, Journal of Applied materials vol. 83, No. 7(1998)3490-3494).*
Dietzel et al., "Nanopatterning of Magnetic Disks by Single-Step Ar+ Ion Projection," Advanced Materials, Jul. 17, 2003, vol. 15, pp. 1152-1155.
Driskill-Smith, "Electron-Beam and Emerging Lithography for the Magnetic Recording Industry," Keynote Address, Proc. of SPIE, 2004, vol. 5374, pp. 16-30.
Rettner et al., Patterning of Granular Magnetic Media with a Focused Ion Beam to Produce Single-Domain Islands at >140 Gbit/in2, IEEE Transactions on Magnetics, Jul. 4, 2001, vol. 37, pp. 1649-1651.
Ross et al., "Fabrication of Patterned Media for High Density Magnetic Storage," Journal of Vacuum Science and Technology B, Nov./Dec. 1999, vol. 17, pp. 3168-3176.

(Continued)

*Primary Examiner* — Michael Cleveland
*Assistant Examiner* — Tabassom Tadayyon Eslami
(74) *Attorney, Agent, or Firm* — Ryan B. Kennedy

(57) ABSTRACT

A method to increase the storage density on magnetic recording media by physically separating the individual bits from each other with a non-magnetic medium (so-called bit patterned media). This allows the bits to be closely packed together without creating magnetic "cross-talk" between adjacent bits. In one embodiment, ferromagnetic particles are submerged in a resin solution, contained in a reservoir. The bottom of the reservoir is made of piezoelectric material.

7 Claims, 7 Drawing Sheets

(56) References Cited

OTHER PUBLICATIONS

Shi et al., Acoustic Tweezers: Patterning Cells and Microparticles Using Standing Surface Acoustic Waves (SSAW), Lab on a Chip, Miniaturisation for Chemistry, Physics, Biology, & Bioengineering, Oct. 21, 2009, vol. 9, pp. 2890-2895.

Soeno et al., "Feasibility of Discrete Track Perpendicular Media for High Track Density Recording," IEEE Transactions on Magnetics, Jul. 4, 2003, vol. 39, pp. 1967-1971.

Gherardini et al., "A New Ultrasound-Based Cell Immobilisation Technique," Acoustics of Dispersed Particulate Matter, (Invited Paper), 2002, pp. 1-6.

Saito et al., "Fabrication of a Polymer Composite with Periodic Structure by the use of Ultrasonic Waves," Journal of Applied Physics, Apr. 1, 1998, vol. 83, pp. 3490-3494.

Saito et al., "Microorganism Manipulation and Microparticle Arrangement by the use of Ultrasonic Standing Waves," BioMEMS and Smart Nanostructures, Proc. SPIE, 2001, vol. 4590.

* cited by examiner

METHOD TO MANUFACTURE BIT PATTERNED MAGNETIC RECORDING MEDIA

CROSS-REFERENCE TO RELATED APPLICATIONS

The present application claims the benefit of U.S. Provisional Patent Application No. 61/340,113 for "Method To Manufacture Bit Patterned Magnetic Recording Media" which was filed on Mar. 12, 2010, the entire contents of which is hereby specifically incorporated by reference herein for all that it discloses and teaches.

STATEMENT REGARDING FEDERAL RIGHTS

This invention was made with government support under Contract No. DE-AC52-06NA25396, awarded by the U.S. Department of Energy. The government has certain rights in the invention.

BACKGROUND OF INVENTION

This invention relates to a method for manufacturing bit patterned magnetic recording media using either surface acoustic wave devices or bulk waves. To increase the storage density of hard disk drives, bits need to be reduced in size, and be more closely packed on the magnetic disk. To avoid "magnetic cross-talk" between neighboring bits (interference of adjacent magnetic fields) when bits are recorded closer together, a physical separation needs to be created between adjacent bits. State-of-the-art manufacturing methods for these magnetic media such as nanolithography and nanoimprinting are expensive and tedious.

Typically, nanolithography is used to make a "master." This master is then used to stamp several thousand of discrete track recording ("DTR") or bit patterned media ("BPM") disks. The grooves created between adjacent tracks or between adjacent bits are on the order of several nanometers to several tens of nanometers wide as well as deep. The lithography process is imperfect, and, thus, defects can exist on the surface of the master, which are then transferred to an imprinted disk. Creating a "master" is expensive. Applying nanolithography to a disk of 3.5" (desktop products) or 2.5" (laptop products) takes a lot of time. Additional problems exist with the state-of-the-art technology. The groove area needs to be filled with a non-magnetic medium. The magnetic read/write head is attached to a slider which "flies" over the magnetic medium at a spacing of 8-10 nm. Groove areas would periodically increase this spacing and give rise to dynamic instabilities in the flying behavior of the slider. Filling up nanometer sized grooves is, again, not straightforward to do, time consuming and costly.

SUMMARY OF THE INVENTION

The present invention is a method based on ultrasonic techniques to create bit patterned magnetic recording media. The patterns are first formed in the bulk of the fluid contained in a reservoir, and then deposited on the substrate due to gravity. This pattern then attaches itself to the substrate as the host fluid evaporates.

These recording media consist of magnetic islands, physically separated from each other by a non-magnetic medium. This allows the magnetic bits to be closely packed together without creating magnetic interference between the individual bits. The method of the present invention avoids tedious and expensive nanofabrication techniques such as nanolithography and nanoimprint.

BRIEF DESCRIPTION OF THE FIGURES

FIG. 1a shows a square reservoir and FIG. 1b shows a cylindrical reservoir.

DETAILED DESCRIPTION

Figure 1A:
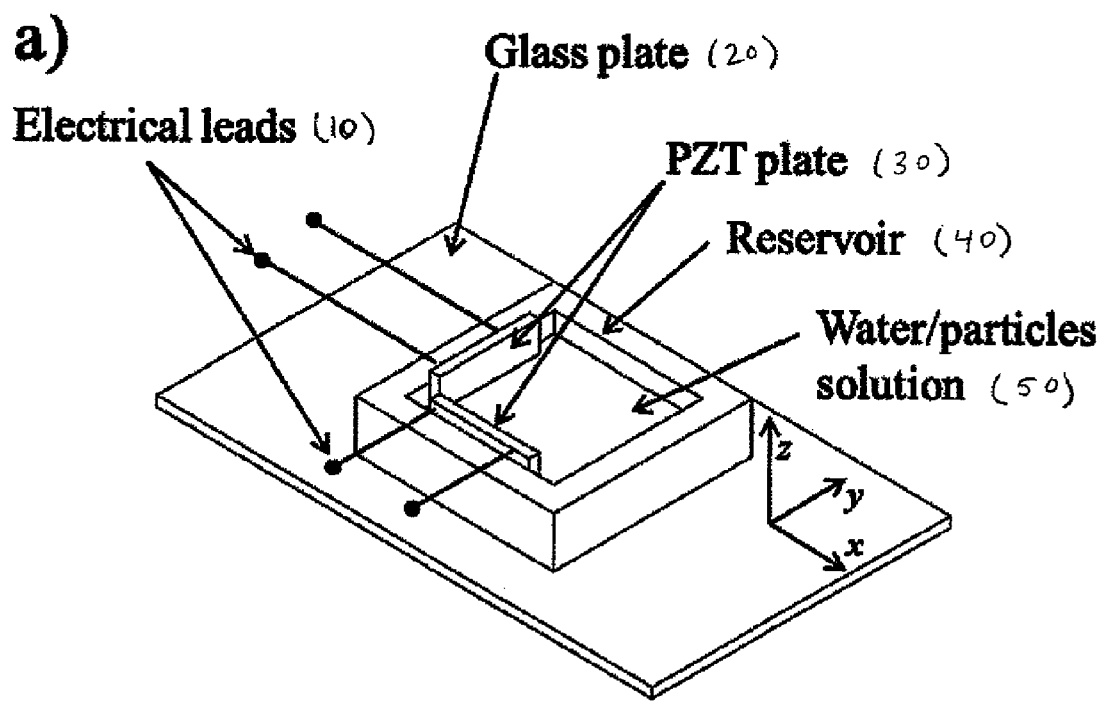
FIGS. 1a & b shows an embodiment of the apparatus used to implement the present invention, where

All current research in the field of magnetic recording media is focused on mechanical manufacturing methods that are asymptotically reaching a plateau and no significant breakthroughs have happened in the past 5 years. The present invention takes a completely different approach. The present method is based on acoustic waves manipulating magnetic islands instead of mechanically machining them. The disclosed technology avoids many of the problems posed by state-of-the-art bit patterned media manufacturing methods.

In one example, ferromagnetic particles are submerged in a resin solution, contained in a reservoir. The bottom of the reservoir is made of piezoelectric material. Two surface acoustic wave (SAW) devices create standing pressure wave interference patterns between the walls of the reservoir. The ferromagnetic particles congregate in the areas of minimal pressure. The patterns, of ferromagnetic particles thus formed are adjustable by tuning the frequency and power of the SAW devices. The pattern is finally fixated by curing the resin with UV light. However, any type of particles may be used with the method of the present invention.

A medium for magnetic storage has been created where each ferromagnetic particle represents a bit, and is physically separated from its neighboring bits by the non-magnetic resin. The hardened resin with ferromagnetic particle array can be used in two different ways. First, the magnetic medium can be used in conventional hard disk drives, i.e., as a spinning disk. Secondly, an entire new magnetic storage apparatus where the magnetic read/write head is mounted on a nanoactuator that positions it over the desired bits to read and write may be created. Regardless, the disk will need to be polished in a similar manner to current hard disk manufacturing procedures to allow the magnetic read/write head to "fly" over the recording medium at a spacing of approximately 8 to 10 nm. The very narrow spacing between read/write head and recording medium is required to allow magnetic coupling between the ferromagnetic particles and the read/write head.

Current methods based on nanolithography and nanoimprint technology require the production of an expensive "master" that is used to imprint thousands of bit patterned disks. The bit patterned media consist of millions of cylindrical "islands" that are used to store a single bit. The current method does not need any mechanical imprinting to develop a pattern of distinct ferromagnetic entities, but is entirely based on surface acoustic waves. The lithography process is imperfect, and, thus, defects can exist on the surface of the master, which are then transferred to the imprinted disk. Creating a "master" is expensive. In contrast, the present method guarantees defect-free separation of the magnetic entities at a very low cost and high speed.

By positioning ferromagnetic particles in user-defined patterns, magnetic recording media with higher storage density may be manufactured. The storage density of state-of-the-art conventional magnetic recording media is 300 Gbit/inch$^2$. Bit patterned media can yield a storage density of 1 Tbit/inch$^2$.

Since the present approach starts out from a nonmagnetic host fluid with ferromagnetic particles, the technology eliminates the need for filling the area around the pattern of "islands" with a non-magnetic material. This allows for a reduction in cost and processing time even further.

Commercial applications of the present invention are in the area of hard disk magnetic storage and other alternative magnetic data storage devices. For example, this technology will be appropriate for any application that requires a large amount of data storage starting from personal computers, to banking to data centers and networks storage to mention a few. The present technology may be used a replacement of a disk in a current state-of-the-art hard disk drive, or used as an entire new magnetic recording device, where the recording head is moving over a stationary recording medium, created with the disclosed technique. Thumb drive-like devices would also be possible.

In one embodiment of the present invention, ferromagnetic particles are submerged in a resin solution, contained in a reservoir. The bottom of the reservoir is made of piezoelectric material (Lithium Niobate). Two surface acoustic wave (SAW) devices, deposited on the piezoelectric substrate create standing pressure wave interference patterns between the walls of the reservoir. The ferromagnetic particles congregate in the areas of minimal pressure. The patterns of ferromagnetic particles thus formed are adjustable by tuning the frequency and power of the SAW devices. The position and shape of the SAW devices also determines the shape of the pattern, which can be rectangular, circular or any other desired shape. The pattern is finally fixated by curing the resin with UV light. A medium for magnetic storage has been created where each ferromagnetic particle represents a bit, and is physically separated from its neighboring bits by the non-magnetic resin. The SAW device consists of a gold plated interdigital transducer (IDT), which polarizes the piezoelectric substrate when powered. The total size of the IDT is approximately 0.5×0.5 cm and the width of the "fingers" of the IDT is on the order of several micrometers, depending on the desired wavelength of the surface waves to be created. The substrate is approximately 1 mm thick and 2×2 cm in size. Two SAW devices fit on the substrate material to create a 2D interference pattern of ultrasonic standing waves.

Figure 1B:
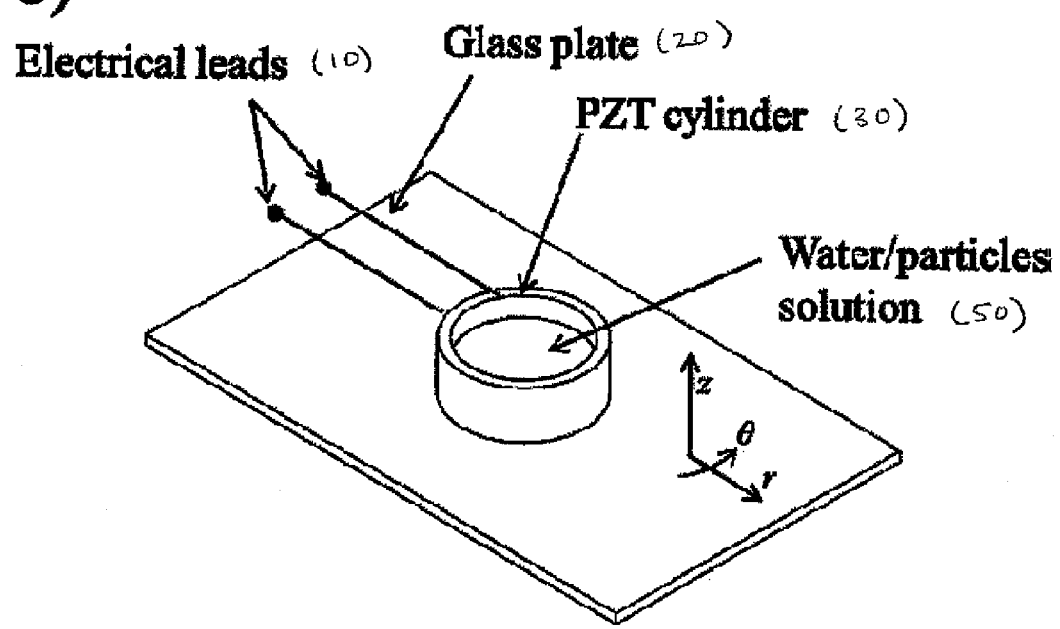

The present invention involves manipulating nanoparticles in rectangular as well as in concentric patterns. FIGS. 1a & b shows an embodiment of an apparatus used in the present invention, including electrical leads 10, a glass plate 20, a PZT plate or cylinder 30, and a solution 50 made up of water and particles. FIG. 1(a) shows a square Plexiglas reservoir 40 (length 15 mm, depth 5 mm). In one example, two rectangular plates of lead zirconate titanate (PZT)-5 material (length 10 mm, height 6 mm, 1 mm thick) were mounted on two inner walls of the square reservoir 40 as indicated in FIG. 1a. FIG. 1b displays a similar setup consisting of a short length of a piezoelectric (PZT-5) cylinder 30 (inner diameter 10 mm, depth 5 mm, 1 mm thick) glued on a glass plate. The center resonance frequency of both the PZT cylinder 30 and the PZT plates 30 is 2 MHz and was related to the thickness of the PZT material. These resonators were driven using a continuous sine wave by a signal generator ($\leq$10 V pk-pk) without any amplifier to create pressure waves inside the respective reservoirs 30, 40. The reservoirs 30, 40 are filled with a disperse solution of water and nanoparticles 50. The initial fluid level in the reservoirs was 3 mm. An optical microscope was positioned directly above the reservoirs 30, 40 to image the formation of patterns of nanoparticles.

In one example, spherical diamond nanoparticles were used with a diameter of 5 nm (UltraDiamond96, obtained from Ultradiamond Technologies, Inc.). The diamond nanoparticles contain 96% diamond; the remaining 4% consists of graphite and amorphous carbon. The diamond nanoparticles were not treated with a surfactant to keep them dispersed in the solution. The nanoparticle concentration in the host fluid (water in the example discussed above) was chosen to be sufficiently small to make the effect of multiple scattering negligible. The acoustic pressure emitted at the source (a single PZT plate 30) in the square reservoir 40 was measured by a calibrated needle hydrophone (ONDA Corp. HNR-1000, diameter 1.5 mm) for different frequencies at a fixed excitation voltage of 10 V. The small size of the needle hydrophone ensures that the pressure measurement is minimally corrupted by introducing the hydrophone in the reservoir. The second PZT plate was not energized while performing the measurement. The pressure measurements are presented in Table 1.

TABLE 1

Maximum Acoustic Pressure For Different Frequencies.

| Frequency (MHz) | Pressure (Pa) |
| --- | --- |
| 1 | 7.65 × 104 |
| 2 | 5.02 × 105 |
| 5 | 1.90 × 105 |
| 10 | 4.08 × 105 |

The maximum acoustic pressure was observed at the resonance frequency of the PZT crystal (2 MHz) as expected from the frequency response function of the PZT crystal.

Figure 2:
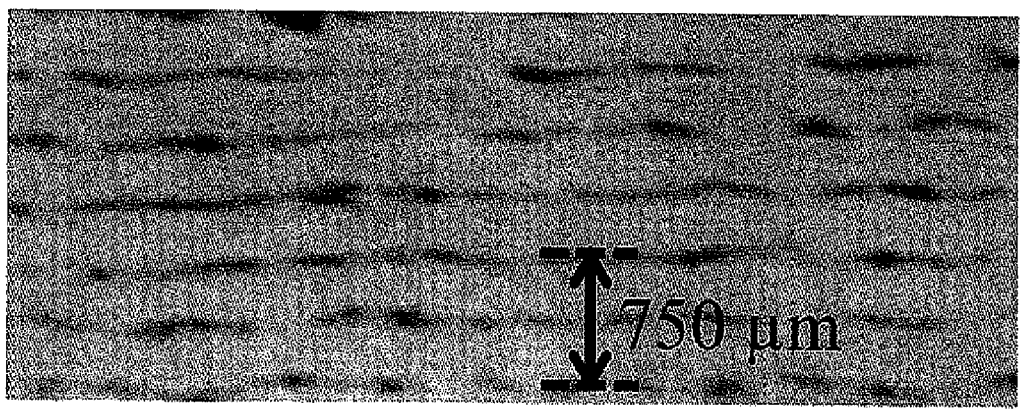
FIGS. 2a & b shows a 5 nm diameter spherical diamond nanoparticles in a (a) one dimensional acoustic field and (b) two-dimensional acoustic field.
Figure 2:
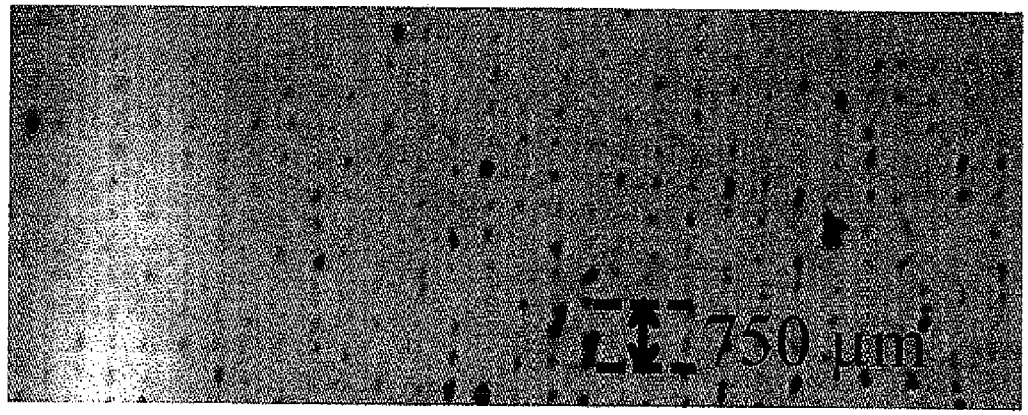

FIG. 2 shows the results obtained with the square reservoir and two orthogonally oriented PZT plates tuned to their resonance frequency of 2 MHz. In FIG. 2a only one PZT plate in a given orientation was used as a source, resulting in line patterns of the nanoparticles assembling at the nodal locations of the standing acoustic wave. In FIG. 2b the two orthogonally oriented PZT plates were simultaneously excited. The wavelength in water at 2 MHz is 750/Lm, as indicated in the figure.

FIG. 2b shows that the particles do assemble at the nodal points of the interference pattern created by the superposition of two orthogonally oriented standing waves, as expected. The patterns were observed over the entire surface in the respective reservoirs. Since the PZT plates do not cover the entire wall of the square reservoir [see FIG. 1a], minimal boundary effects were observed at the edges of the standing wave interference pattern.

Figure 3:
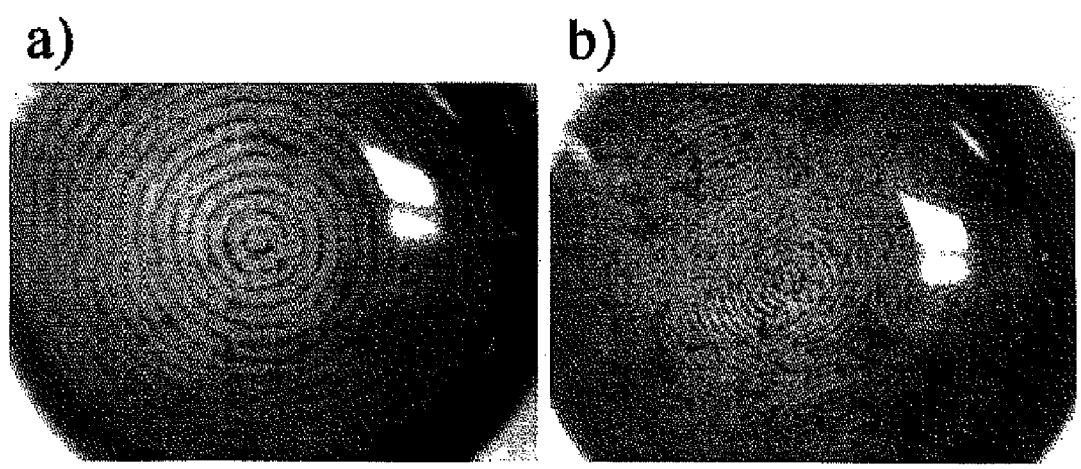
FIGS. 3a & b shows a 5 nm diameter spherical diamond nanoparticles in a concentric pattern: (a) 2 MHz and (b) 4 MHz.

FIG. 3 shows the experimental results obtained with the cylindrical PZT reservoir, using a solution of water and 5 nm diamond particles. Standing waves were created in the cylindrical reservoir at frequencies of 2 MHz [FIG. 3a], and 4 MHz [FIG. 3b], respectively. The pattern formation on the substrate is a two-step process. First the nanoparticles assemble at the nodes of the standing wave pattern in the cylindrical reservoir due to acoustic radiation force. These patterns then drift downward due to gravity over a small distance (1-3 mm) and settle down on the glass substrate below. As the host fluid evaporates, the pattern becomes attached to the substrate. The spacing of the pattern depends on the frequency used and it becomes more densely spaced with increased frequency.

It is noted that the concentric rings and the clusters of nanoparticles in FIGS. 2 and 3 are not identical in size, i.e., not all the nodal points in FIG. 2b and the nodal concentric circles in FIGS. 3a and 3b collected an equal number of nanoparticles. Therefore, they do not have exactly the same size. This may be the result of a nonuniformly dispersed solution of nanoparticles and water prior to starting the experiment.

It is worth pointing out that no acoustic streaming or cavitation was observed during the experiments consistent with the low acoustic pressures used (see Table 1).

Figure 4:
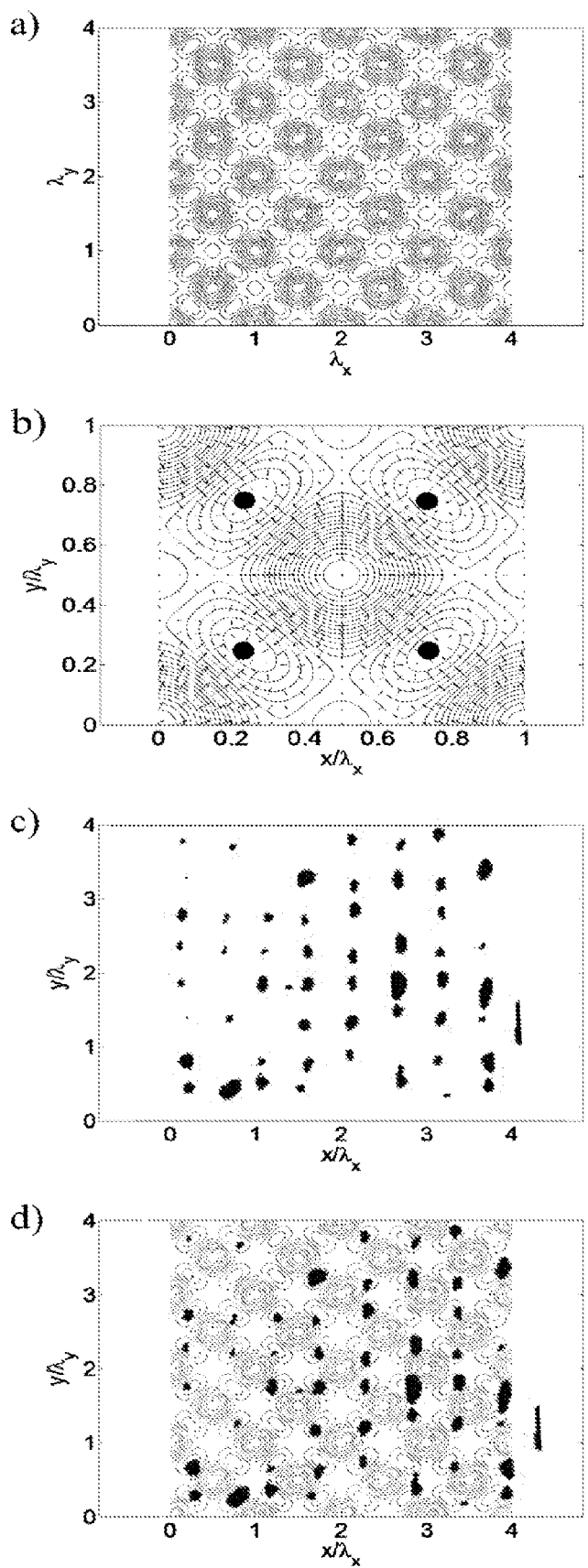
FIGS. 4a, b, c & d shows force potential for spherical diamond nanoparticles with a diameter of 5 nm in water in a rectangular reservoir (a) four wavelengths and (b) one wavelength. Arrows indicate the negative gradient of the force potential, i.e., the acoustic radiation force, (c) extract of FIG. 2 (four wavelengths), converted into a binary image, (d) overlap of theoretical and experimental results.

FIG. 4 compares the predictions from Gor'kov's model and the experimental results obtained with 5 nm diamond spheres in water (square reservoir). FIG. 4a illustrates the force potential resulting from the superposition of two orthogonally oriented cosine functions with identical amplitude, frequency and phase. These results are displayed for four wavelengths in both x and y direction. FIG. 4b is a magnification of FIG. 4a showing only a single wavelength in x and y direction. The force field is indicated by arrows in FIG. 4b. The length of the arrows is proportional to the magnitude of the acoustic radiation force, while the orientation of the arrow indicates the direction of the force. According to Gor'kov's model, the particles collect at two locations per wavelength, corresponding to the minima of the force potential. The minima are indicated in FIG. 4b by solid dots. FIG. 4c is an expanded view of a small section of FIG. 2(b) (range of four by four wavelengths). The image has been converted to a binary image to accentuate the locations where the 5 nm diamond spheres accumulate. Overlapping FIGS. 4a and 4c in FIG. 4d illustrates the agreement between the experimental results obtained with the nanoparticles and the simulation using Gor'kov's model.

Figure 5:
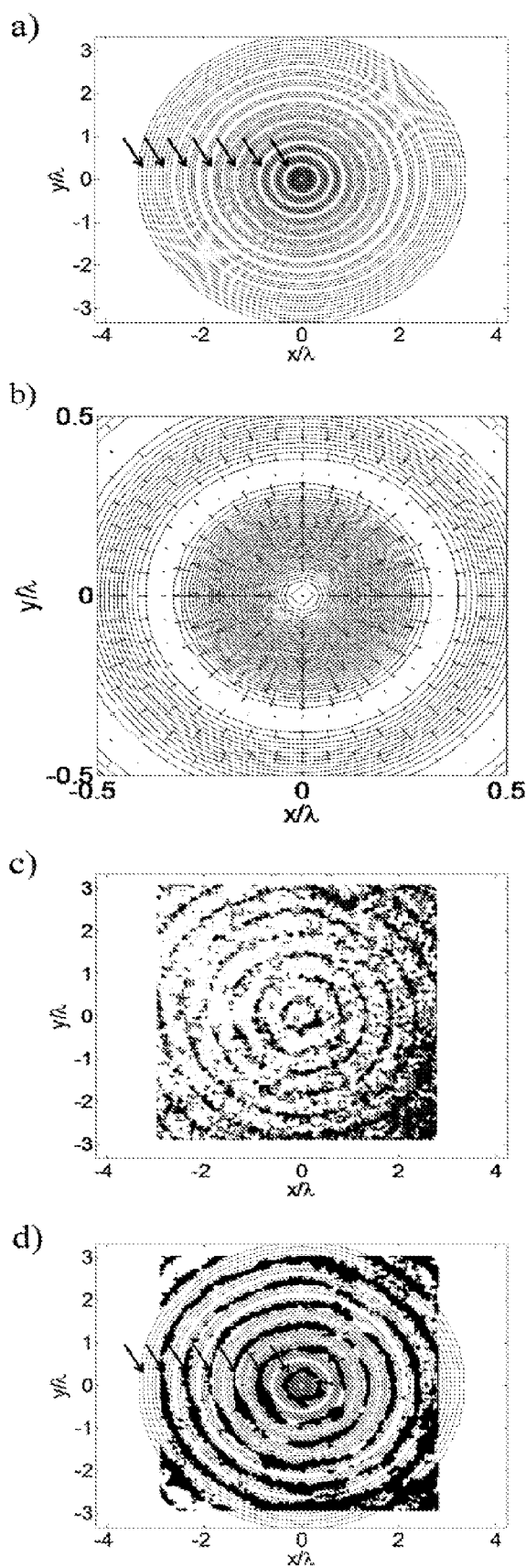
FIGS. 5a, b, c & d shows force potential for spherical diamond nanoparticles with a diameter of 5 nm in water in a rectangular reservoir (a) four wavelengths and (b) one wavelength. Arrows indicate the negative gradient of the force potential, i.e., the acoustic radiation force, (c) extract of FIG. 3 (four wavelengths), converted into a binary image, (d) overlap of theoretical and experimental results.

FIG. 5 provides a comparison between the model predictions and the experimental results obtained with 5 nm diamond spheres in water for the cylindrical reservoir. FIG. 5(a) shows the force potential. The results are shown over a spatial extent of four wavelengths across the diameter of the reservoir. The arrows indicate the concentric circles where the nanoparticles will accumulate.

FIG. 5b is an expanded view of FIG. 5a, showing a single wavelength centered around the central axis of the cylindrical reservoir. The force field is indicated by arrow vectors in FIG. 5b. The spacing between the concentric circles where particles collect does not remain constant across the diameter of the reservoir because the spacing between zeros of the Bessel function of the first kind is not constant. The minima are indicated in FIG. 5b as a solid black circle. FIG. 5c is an extract from FIG. 2b.

As before, the image has been converted to a binary image to accentuate the locations where the 5 nm diamond spheres accumulate. Consistent with the previous case of rectangular geometry, there is very good agreement between the experimental results obtained with the nanoparticles and the simulation as can be seen from a comparison between FIGS. 5a and 5c in FIG. 5d. Note that in FIG. 5c, the concentric rings of particles are not perfectly separated from each other, and few particles seem to float in between the rings.

Figure 6:
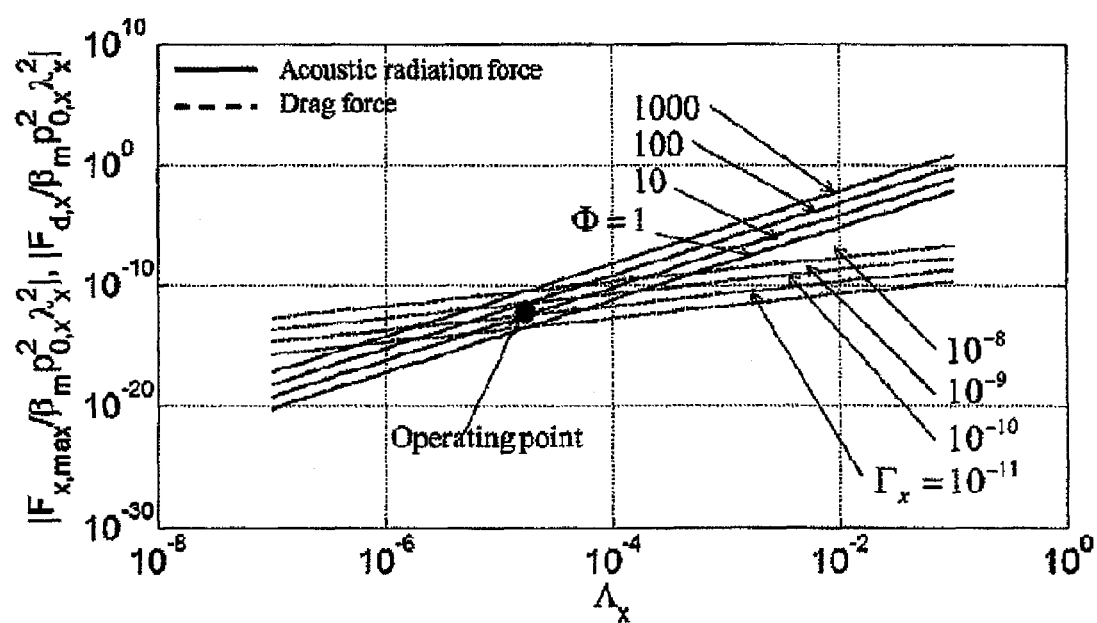
FIG. 6 shows the nondimensional maximum acoustic radiation force (x-direction) vs. the nondimensional particle radius for different values of the acoustic contrast factor.

FIG. 6 shows a double logarithmic plot of the nondimensional maximum acoustic radiation force (x-direction) versus the nondimensional particle radius Ax for different values of the acoustic contrast factor $\phi$ (solid lines). FIG. 6 also shows the nondimensional drag force acting on a nanoparticle while it is moving under the influence of the acoustic radiation force, versus the nondimensional particle radius $\Lambda_x$, for different values of the nondimensional particle velocity fx(dashed lines). The acoustic pressure used to obtain this graph was chosen equal to the maximum pressure at the resonance frequency of the piezocrystal (500 kPa, see Table 1).

From FIG. 6 it is observed that the nondimensional maximum acoustic radiation force increases with increasing particle radius, and with increasing values of the acoustic contrast factor $\phi$. We also observe that the nondimensional drag force increases with increasing particle radius and with increasing values of the nondimensional particle velocity $T_x$. The intersections of the respective force and drag curves mark the limits of particle sizes that can be manipulated for a particular $\phi$ and $T_x$. The operating point for the rectangular pattern experiment is indicated with a black dot. It is observed that in the present situation $\phi=1.9$ and a particle speed of $T_x=10^{-10}$ can be obtained.

While in the case of microparticles the separation between host fluid and particles occurs quasi-instantaneously, it takes on the order of seconds or even minutes to separate the nanoparticles from the host fluid at the nodal locations of the standing wave pattern. FIG. 6 provides some clarification. The magnitude of the acoustic radiation force must exceed the magnitude of the corresponding drag force for a particle to move. Since the vast majority of the particles are far away ($\geq 2$ R) from the substrate when creating the pattern, Stokes drag force equation is used rather than accounting for the wall effect that is experienced by only a few particles in close proximity (<2 R) to the substrate while being driven to the pressure nodes. From FIG. 6 it is observed that for small values of $\Lambda_x \leq 10^{-5}$), which corresponds to nanoparticles in a 1 to 10 MHz acoustic field, the magnitude of the acoustic radiation force may not be large enough to overcome the drag force. The magnitude of the acoustic radiation force can be increased by choosing a high acoustic contrast factor. This can be obtained by choosing particles with high density and low compressibility compared to the host fluid. Additionally, the magnitude of the acoustic radiation force can be increased by increasing the acoustic pressure at the source. This implies that the solid curves representing the acoustic radiation force in FIG. 6 would shift upwards with increasing source pressure.

The velocity at which the nanoparticles move through the host fluid is slow. For instance, $T_x=10^{-10}$ corresponds to a speed of 0.15 µm/s in water under atmospheric conditions. This low velocity corresponds to the experimental observations. For a 2 MHz acoustic wave in water, the wavelength corresponds to 750 µm. The maximum travel of the particles is a quarter wavelength or 187.5 µm (see FIG. 3). At a speed of 0.15 µm/s it would thus take 1250 s for the furthest particle to reach the pressure node. This time estimate matches the observation during the experiments well.

As a result of the secondary acoustic radiation force the nanoparticles are attracted to each other when they are forced into close proximity. The acoustic radiation force is no longer acting on a single particle but on a cluster of particles with a larger radius $\Lambda_X$ than the radius of an individual particle. Hence, the magnitude of the acoustic radiation force increases relative to the drag force (radiation force $\sim R^3$, drag force $\sim R$), thereby increasing the speed of separation. $T_x = 10^{-11}$ corresponds to a speed of 15 nm/s in water under atmospheric conditions. It is clear that while the particles are still being driven to the pressure nodes of the standing wave pattern, the separation would take too long, unless clustering as a result of the secondary Bjerknes force would increase $\Lambda_X$ and, thus, accelerate the particle separation from the host fluid. Because the separation of nanoparticles in the host fluid occurs slower than in the case of microparticles, this technique is less suitable to use for a continuous separation process of nanoparticles than a continuous separation of microparticles (e.g., flow cytometry).

From FIG. 3 it is clear that the pattern created at the second harmonic of the source [FIG. 3b] is more distorted than the one created at the center frequency of the source [FIG. 3a]. The acoustic radiation force is proportional to the source frequency. However, the attenuation of a pressure wave in water is proportional to the square of the frequency. The net result is that it becomes more difficult to create undistorted patterns for increasing frequency, especially further away from the source (effect of increased attenuation dominates).

The patterns that were formed at the pressure nodes on a glass substrate were deposited. The particles are subject to the gravitational force, and will thus be forced toward the glass substrate where they are deposited. Additionally, the fluid in the reservoir evaporates and accelerates the process of depositing the particles on the glass substrate. In one example, water was used as a medium with nanoparticles dispersed in it. Other fluids, however, could be used as well, and could be chosen such that the evaporation process is accelerated. When working with small reservoirs one needs to consider the surface tension of the host fluid. If the contact angle deviates significantly from 90°, the fluid level will not be horizontal. Hence, when the host fluid evaporates the pattern may become distorted. Evidence of this was seen when using acetone as a host fluid rather than water. Patterns can also be formed by capillary flow 42 (so-called "coffee ring effect"). The results obtained by evaporation only (without a sound field) indeed evacuated the particles from the center of the cylinder. However, patterns similar to the ones obtained with acoustic standing waves were not observed.

Many applications can be thought of for this technique. It can be used to design two dimensional nanostructured materials, where particles with particular properties can be positioned with prescribed periodicity in a binder matrix. The patterns that are obtained in the host fluid after exposing the mixture to an acoustic field can be deposited on a substrate by allowing the host fluid to evaporate.

The following has been found when using bulk acoustic waves to manipulate diamond nanospheres in user-defined patterns and then depositing these patterns on a glass substrate:

1. Using bulk waves allows manipulating nanoparticles into clusters that form a user-defined pattern. Rectangular as well as concentric patterns have been demonstrated.
2. Gor'kov's model for the acoustic radiation force is still valid for nanoparticles, and the predictions of the model agree well with the obtained experimental results.
3. By calculating the drag force acting on a nanoparticle as it is moving through the host fluid, and by calculating the magnitude of the acoustic radiation force, it was shown that nanoparticles can be moved through a host fluid by means of the acoustic radiation force. Limits for the size of the nanoparticles that can be moved were established based on the particle and host fluid properties.
4. Using bulk waves instead of SAWs has significant advantages (inexpensive, easy, and flexible).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of manufacture user-defined patterns of nanostructures comprising:
   submerging particles in a resin solution contained in a reservoir;
   using one or more acoustic wave devices to create standing pressure wave interference patterns between walls of the reservoir to form the particles in patterns;
   adjusting the patterns of the particles by tuning the frequency and power of the one or more acoustic wave devices; and
   creating staggered layers of particles to increase the density of the particles.

2. The method of claim 1, wherein the particles are substantially spherical.

3. The method of claim 1, wherein the particles are ferromagnetic.

4. The method of claim 1, wherein the particles are diamond nanoparticles.

5. The method of claim 1, wherein the one or more acoustic wave devices comprise one or more surface area acoustic wave devices.

6. The method of claim 1, wherein the one or more acoustic wave devices comprise one or more bulk wave acoustic devices.

7. The method of claim 1, wherein the method is used to manufacture bit patterned magnetic recording media.

* * * * *